US012325268B2

(12) United States Patent
Scruggs (10) Patent No.: US 12,325,268 B2
(45) Date of Patent: Jun. 10, 2025

(54) GOOSENECK HITCH WITH ADJUSTABLE ROTATION LOCKING MECHANISM

(71) Applicant: HORIZON GLOBAL AMERICAS INC., Plymouth, MI (US)

(72) Inventor: Mark Scruggs, Walled Lake, MI (US)

(73) Assignee: Horizon Global Americas Inc., Plymouth, MI (US)

( * ) Notice: Subject to any disclaimer, the term of this patent is extended or adjusted under 35 U.S.C. 154(b) by 790 days.

(21) Appl. No.: 17/497,145

(22) Filed: Oct. 8, 2021

(65) Prior Publication Data

US 2022/0111690 A1 Apr. 14, 2022

Related U.S. Application Data

(60) Provisional application No. 63/089,259, filed on Oct. 8, 2020.

(51) Int. Cl.
  *B60D 1/06* (2006.01)
  *B60D 1/167* (2006.01)
  *B60D 1/60* (2006.01)

(52) U.S. Cl.
  CPC .............. *B60D 1/065* (2013.01); *B60D 1/60* (2013.01); *B60D 1/167* (2013.01)

(58) Field of Classification Search
  CPC ........... B60D 1/065; B60D 1/60; B60D 1/167
  See application file for complete search history.

(56) References Cited

U.S. PATENT DOCUMENTS

| | | | |
|---|---|---|---|
| 5,890,728 A * | 4/1999 | Zilm | B62D 53/08 280/433 |
| 6,398,250 B1 * | 6/2002 | Hashman | B62D 53/0871 280/901 |
| 6,776,431 B1 * | 8/2004 | Dick | B62D 53/0828 280/425.2 |
| 6,883,820 B2 * | 4/2005 | Freeman | B60D 1/065 280/425.2 |
| 7,000,937 B2 * | 2/2006 | Dick | B62D 53/061 280/433 |
| 7,703,792 B1 * | 4/2010 | Heitzmann | B62D 53/061 280/455.1 |
| 7,712,761 B2 * | 5/2010 | Mater, Jr. | B60D 1/50 280/441 |
| 8,414,009 B2 | 4/2013 | Stanifer et al. | |
| 9,802,451 B2 | 10/2017 | Mida et al. | |
| 9,834,050 B2 | 12/2017 | Stanifer et al. | |
| 9,944,137 B2 * | 4/2018 | Curl | B62D 53/0828 |
| 11,084,343 B2 | 8/2021 | Curl et al. | |
| 2010/0140899 A1 * | 6/2010 | McCoy | B60D 1/06 280/441.2 |

\* cited by examiner

*Primary Examiner* — Kevin Hurley
*Assistant Examiner* — Michael R Stabley (57) ABSTRACT

A gooseneck hitch assembly for coupling a towed vehicle to a towing vehicle is disclosed. The gooseneck hitch assembly includes a vehicle attachment assembly that, when unlocked, rotates about an offset vertical axis relative to a body of the gooseneck hitch assembly. The gooseneck hitch assembly also includes a goose ball attachment assembly to couple to a goose ball mounted to the towing vehicle, that when unlocked, provides rotation about a towing vertical axis.

15 Claims, 9 Drawing Sheets

GOOSENECK HITCH WITH ADJUSTABLE ROTATION LOCKING MECHANISM

RELATED APPLICATIONS

This application claims priority to Provisional Application No. 63/089,259 entitled "GOOSENECK HITCH WITH ADJUSTABLE ROTATION LOCKING MECHANISM," filed Oct. 8, 2020, which is incorporated herein by reference in its entirety.

TECHNICAL FIELD

The present invention is generally related to a towing assembly and, more particularly, to a pin box assembly with an adjustable engagement device.

BACKGROUND

Many vehicles are designed to transport freight, goods, merchandise, personal property, and other such cargo. Often, such vehicles may be arranged to tow a trailer by attaching the trailer to the towing vehicle, such as through the use of a hitch assembly of some configuration. The towing industry has developed a number of methods and apparatuses for securing or engaging the towed vehicle or trailer to the towing vehicle, such as a pickup truck.

There are many different types of hitch assemblies in the art that may be attached to the towing vehicle in a variety of ways, depending on the type of hitch assembly utilized. Trailers may be connected to the towing vehicle by way of a hitch assembly including a ball hitch or member secured to the towing vehicle and a ball socket coupling mechanism on the towed vehicle or trailer that mounts to a fifth wheel hitch that allows for the trailer to pivot behind the towing vehicle in a certain manner.

A gooseneck hitch is also utilized with towing vehicles having a goose ball which may be detachably coupled to a goose ball mount in a bed of the towing vehicle. The gooseneck hitch may pivot freely about the goose ball, allowing free articulation (i.e. yaw, pitch, and roll) around a generally spherical goose ball. The gooseneck hitch (e.g., and the trailer) pivots about a vertical axis defined by the goose ball. For some short-bed trucks, this may cause clearance problems between a cabin of the truck and the overhang of the trailer.

Therefore, there is a need for a gooseneck hitch system that is easy to install and operate and that can shift the pivot axis to work with beds of towing vehicles having different lengths.

SUMMARY

A gooseneck hitch assembly for coupling a towed vehicle to a towing vehicle is disclosed. The gooseneck hitch assembly includes a vehicle attachment assembly (sometimes referred to as a "turret") that, when unlocked, rotates about an offset vertical axis (sometime referred to as a "offset yaw axis") relative to a body of the gooseneck hitch assembly. The gooseneck hitch assembly also includes a goose ball attachment assembly to couple to a goose ball mounted to the towing vehicle that, when unlocked, provides rotation about a towing vertical axis (sometime referred to as a "towing yaw axis"). The goose ball attachment assembly, when locked, still facilitates free articulation about horizontal axis (e.g., the pitch axis and the roll axis).

Both vehicle attachment assembly and goose ball attachment assembly are configured to lock rotation about their respective axes. The goose ball attachment assembly locks out the towing yaw axis at the goose ball using a locking pin. The locking pin is installed in a coupler configured to interface with a goose ball that defines a slot configured to receive the locking pin. In some examples, the locking pin is configured to be removable from the coupler. To prevent the goose ball from rotating within its sleeve, a stabilizing assembly with arms in forward locations is installed on the under-vehicle mounting plate. The vehicle attachment assembly locks out the offset yaw axis using a locking pin installed in a slot interface in the vehicle attachment assembly and the body of the gooseneck hitch assembly. In some examples, the assemblies are configured to use the same lockout pin that is installed in a different location (e.g., the slot interface vehicle attachment assembly, the coupler of the goose ball attachment assembly, etc.) depending on which of the yaw axis the user desires to lock. In some such examples, locking the yaw axes is mutually exclusive so that both yaw axes are not locked at the same time.

The duel locking mechanisms provide flexibility to allow a user to choose which one of the axes (e.g., the towing yaw axis or the offset yaw axis) is more suitable for their vehicle and/or driving circumstances. When the goose ball attachment assembly is locked, the yaw axis of the towing vehicle/towed vehicle connection is the offset yaw axis which is offset from the goose ball by, for example, twenty-two inches. In such a configuration, the pitch and roll axes remain at the goose ball. When the vehicle attachment assembly is locked, the yaw, pitch, and roll axes are all about the goose ball.

BRIEF DESCRIPTION OF THE DRAWINGS

Operation of the present disclosure may be better understood by reference to the following detailed description taken in connection with the following illustrations, wherein.

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

Figure 1:
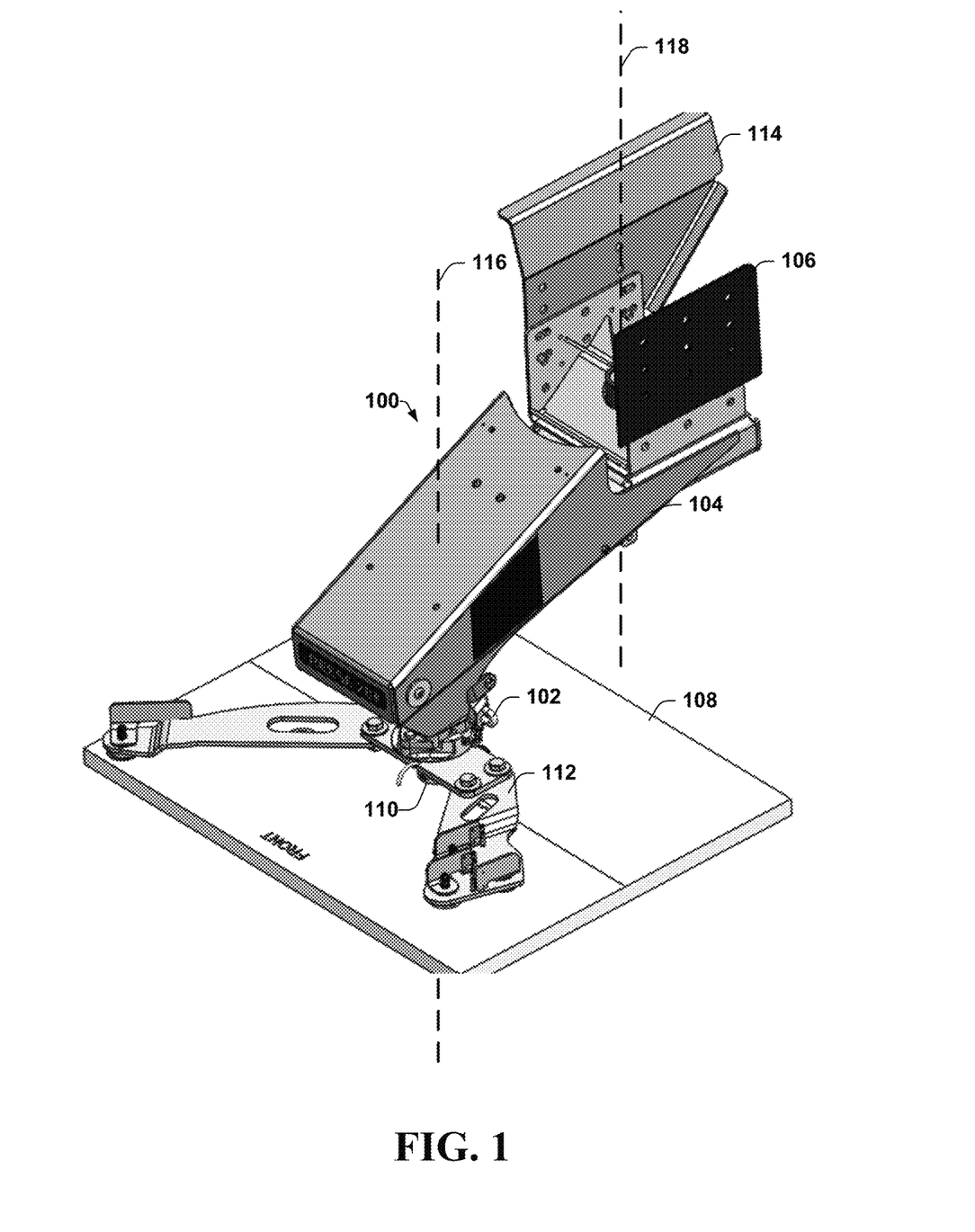
FIG. 1 is a perspective view of an embodiment of a goose neck hitch and goose ball mount operating in accordance with the teachings of this disclosure.

A gooseneck hitch 100 that includes a goose ball attachment assembly 102, a body 104, and a vehicle attachment assembly 106 (sometimes referred to as a "turret") is illustrated in FIG. 1. In the illustrated example, the goose ball attachment assembly 102 is attached to a towing vehicle (e.g., via an upper mounting plate 108) by way of a goose ball 110 supported by a stabilizing assembly 112. The goose ball 110 and the stabilizing assembly 112 are coupled to an under-vehicle mounting frame (not shown). In some examples, the stabilizing assembly 112 may be coupled to the under-vehicle mounting frame through the bed of the towing vehicle (e.g., without the presence of the upper mounting plate 108), such as that disclosed in U.S. Pat. No. 8,414,009, which is incorporated herein by reference. In some examples, stabilizing assembly 112 may be anchored into the bed corrugations or bed walls of the towing vehicle. In some examples, the stabilizing assembly 112 may be attached to any other truck frame attachment to cover non-pickup truck frames (e.g., cab-chassis units, etc.). Additionally, the vehicle attachment assembly 106 is attached to a towed vehicle of any appropriate configuration (e.g., a recreational vehicle (RV), a horse trailer, etc.).

In some examples, gooseneck hitch 100 is configured with the goose ball attachment assembly 102 is positioned to removably attach to the towed vehicle. The vehicle attachment assembly 106 is positioned to be attached to bed and/or frame of the towing vehicle. In such examples, the stabilizing assembly 112 may be configured to be installed on the towed vehicle. In such examples, the goose ball 110 may be attached to the towed vehicle via the stabilizing assembly 112. The vehicle attachment assembly 106 may be attached to the towing vehicle.

The body 104 of the gooseneck hitch 100 may include a suspension system, such as an air ride suspension system. The air ride suspension system may include an air bag and at least one shock absorber. The air ride suspension may absorb shock loads in the vertical or up/down, longitudinal or fore/aft, and rotational directions by utilizing the shock absorbers and the air bag. This may provide for reduced stress on the towed vehicle from the air ride suspension. Examples of such a suspension system are described in U.S. Pat. No. 11,084,343, which is incorporated herein by reference in its entirety. In some examples, the suspension system may include air shocks with a polymer system (e.g., a polymer-filled, etc.) instead of the air bag.

The goose ball 110 and the goose ball attachment assembly 102 are configured to interface with a locking mechanism that, when installed, restrict the rotation of the gooseneck hitch 100 about the goose ball 110. When locked, the gooseneck hitch 100 rotationally couples to the goose ball 110 about horizontal axes (e.g., the pitch axis and the roll axis), but rotation about a vertical axis 116 (sometimes referred to as the "towing yaw axis") is prevented or inhibited. As described in more detail below, in some examples, the locking mechanism comprises a locking pin installed in a coupler of the goose ball attachment assembly 102 that interfaces with a slot defined in the goose ball 110. When unlocked, the gooseneck hitch 100 rotationally couples to the goose ball 110 about the pitch axis, the roll axis, and the towing yaw axis 116. In the illustrated example, the stabilizing assembly 112 prevents or inhibits the goose ball 110 from rotating within it's mounting sleeve (not shown) by, for example, torsion applied to the goose ball 110 via the locking pin in the slot of the goose ball 110 when the towing vehicle turns.

The vehicle attachment assembly 106 is rotatably coupled to the body 104 of the gooseneck hitch 102 about a vertical axis 118 (sometime referred to as the "offset yaw axis"). The body 104 of the gooseneck hitch 100 is configured such that the offset yaw axis 118 is a distance (e.g., twenty-two inches, etc.) from the towing yaw axis 116. The vehicle attachment assembly 106 and the body 104 are configured to interface with a locking mechanism that, when installed, prevent or inhibit rotation of the vehicle attachment assembly 106 relative the body 104 about the offset yaw axis 118. As described in more detail below, the vehicle attachment assembly 106 and the body 104 define corresponding slots to accept a locking pin or other locking mechanism. When locked, the vehicle attachment assembly 106 is prevented or inhibited from rotating about the offset yaw axis 118 relative the body 104. When unlocked, the vehicle attachment assembly 106 rotates about the offset yaw axis 118 relative the body 104. In some examples, the slots of the vehicle attachment assembly 106 and the body 104 may be configured to accept the same locking pin as the used to lock the goose ball attachment assembly 102. In operation, the gooseneck hitch 100 may include only one locking pin such that either the goose ball attachment assembly 102 or the vehicle attachment assembly 106 are locked, and the goose ball attachment assembly 102 and the vehicle attachment assembly 106 are never both locked.

The examples above describe a system that interfaces with a goose ball hitch. However, the gooseneck hitch 100 may be configured to interface with other connection types that (i) when unlocked, allow yaw rotation, roll rotation, and pitch rotation at the connection point with the gooseneck hitch 100, and (ii) when locked, restrict, inhibit, or otherwise prevent yaw rotation. Such examples would also interface with a removable locking pin in the corresponding attachment assembly of the gooseneck hitch 100 that, when installed, locks the yaw rotation. For example, in a short bed truck, the connection on the towing vehicle to interface with may be a large universal joint (e.g., a large truck drive shaft) with a square or rectangular attachment with separate pivoting axis, in place of the goose ball. In such examples, the attachment assembly of the gooseneck hitch 100 would, when the locking pin is installed, prevent the pivoting axis from yaw rotation.

Figure 2A:
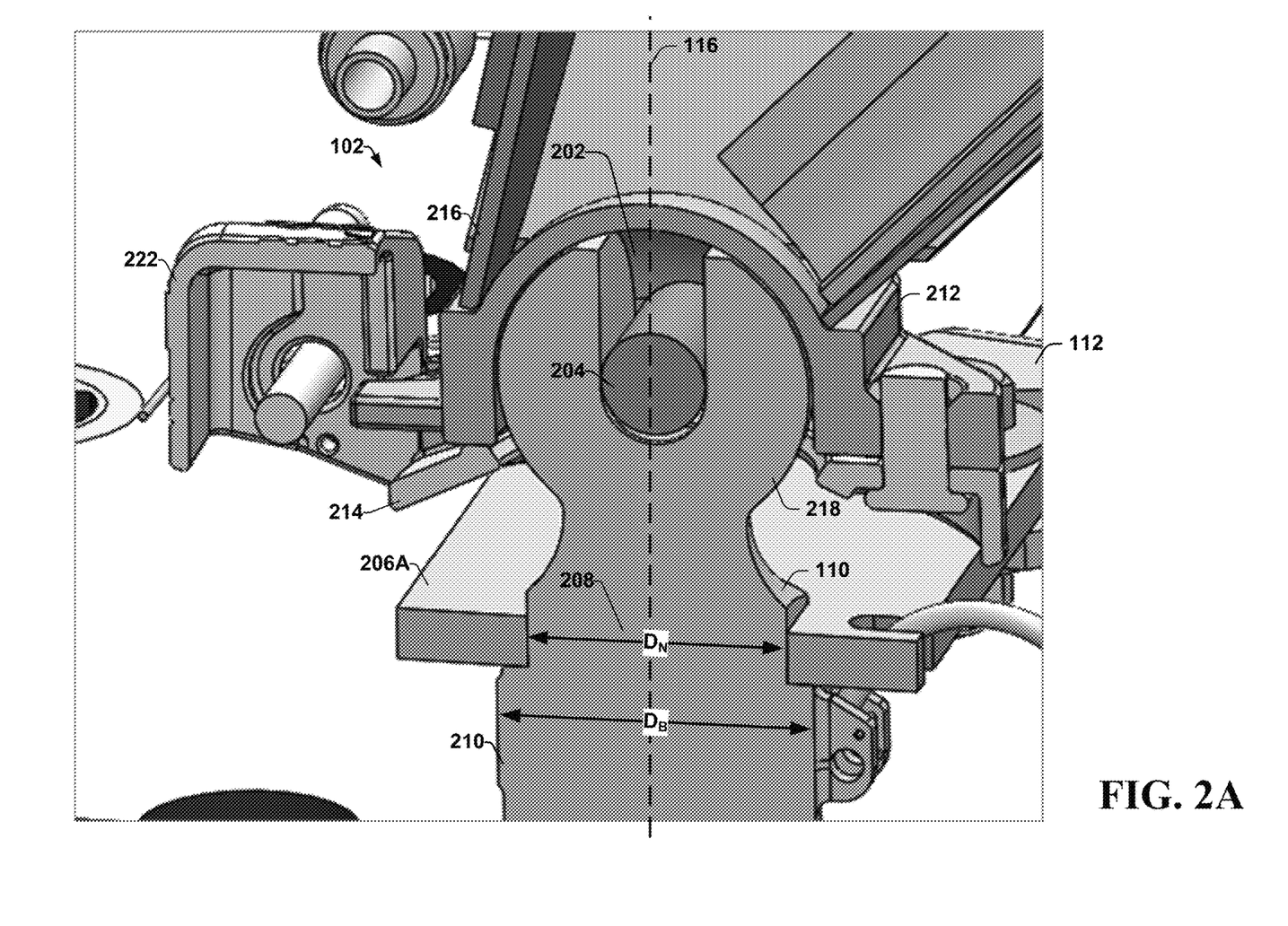
FIGS. 2A and 2B are cross sectional views of a goose ball and a goose ball mounting assembly operating in accordance with the teachings of this disclosure.
Figure 2B:
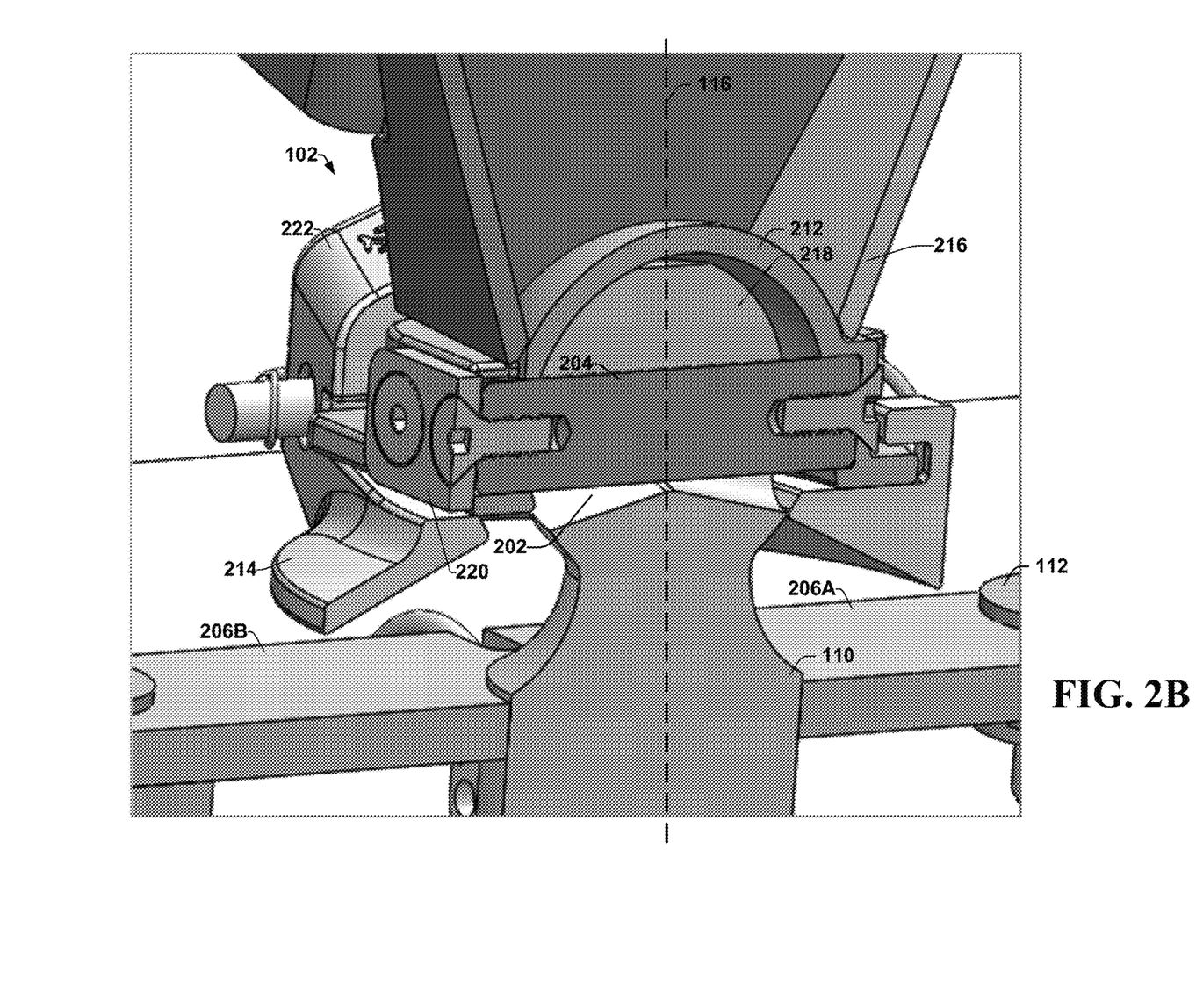

FIGS. 2A and 2B illustrate cross-sectional views of the interface between the goose ball attachment assembly 102, the goose ball 110, and the stabilizing assembly 112. The goose ball 110 defines a slot 202 that bisects the goose ball 110. The slot 202 is configured to interface and receive with a locking pin 204. The locking pin 204, when installed, prevents or inhibits rotation of the gooseneck hitch 100 about the towing yaw axis 116.

The stabilization assembly 112 includes stabilization plates 206A and 206B (collectively, "stabilization plates 206"). The stabilization plates 206 define notches that interface with a neck portion 208 of the goose ball 110. In some examples, at the neck portion 208, the goose ball 110 transitions from a body diameter (DB) of a body portion 210 to a neck diameter (DN) that is less that the body diameter (DB). The notches are configured such that lateral rotational forces acting on the goose ball 110 (e.g., by the locking pin 204 and/or the goose ball attachment assembly 102, etc.) are resisted by the stabilization assembly 112 via the stabilization plates 206A and 206B. In the illustrated example of FIG. 2A, the neck portion 208 has a horizontal cross section with at least two non-curved, parallel sides (e.g., a rectangle, a geometric stadium, etc.).

In the illustrated examples of FIGS. 2A and 2B, the goose ball attachment assembly 102 includes a coupler 212, a collar 214, and an interface 216. The coupler 212 includes a domed portion that defines an internal cavity. The coupler 212 is configured to, when the goose ball attachment assembly 102 is coupled to the goose ball 110, at least partially encompass a ball portion 218 (sometimes referred to as the "head") of the goose ball 110 in the internal cavity. The coupler 212 defines pin slot that traverses the internal cavity so that when the locking pin 204 is inserted into the pin slot, the locking pin 204 traverses the internal cavity from one side of the couple 212 to the other. In some examples, on each side of the pin slot, the coupler 212 defines mounting holes to detachably secure the locking pin 204 to the coupler 212 via fasteners (e.g., screws, etc.). In some such examples, one or more mounting brackets 220 fasten to the locking pin 204 (e.g., one on one side, one on each side, etc.) and the mounting bracket(s) 220 fastens to the coupler 212 to facilitate installation and removal of the locking pin 204. The coupler 212 and/or locking bracket 220 secure the locking pin 204 in position to interface with slot 202 of goose ball 110.

The collar 214 is coupled to coupler 212 to provide a latching mechanism to latch the goose ball attachment assembly 102 onto the goose ball 110. In the illustrated examples, the collar 214 is coupled to the coupler 212 via a fastener through corresponding mounting hole defined in the collar 214 and coupler 212. The collar 214 has a latched and an unlatched position. In the latched position, the collar 214 engages with the goose ball 110 to prevent the goose ball 110 from disengaging with the goose ball attachment assembly 102. In the unlatched position, at least a portion of the collar 214 is not engaged with the goose ball 110 to facilitate engaging and disengaging the goose ball attachment assembly 102 from the goose ball 110 in a substantially vertical direction (e.g., sliding the locking pin 204 in or out of the slot 202). In the illustrated examples, couple 214 includes a latching mechanism 222 that, at one setting, places the collar 214 in a latched position (e.g., in total engagement with the goose ball 110, etc.), and at another setting, places the collar 214 in an unlatched position (e.g., in partial or no engagement with the goose ball 110, etc.).

The interface 216 is coupled to the coupler 212 and/or the collar 214 to connect the body 104 of the gooseneck hitch assembly 100.

In the illustrated examples, to install the locking pin 204 in the goose ball attachment assembly 102, the locking pin 204 is inserted into the pin slot and coupled to (e.g., screwed onto) a fastener inserted into a mounting hole. The mounting bracket 220 may be attached to the locking pin 204 via a fastener and the mounting bracket 220 may be attached the coupler via a fastener. In such a manner, the locking pin 204 may be installed in the goose ball attachment assembly 102 when only one side of the coupler 212 accessible (e.g., the collar 214 obscures or interferes with the other side of the coupler 212, etc.). While a particular configuration of removably attaching the locking pin 204 to the goose ball attachment assembly 102 is shown, any other configuration may be used to secure the locking pin 204 to the coupler 212: (a) with sufficient support as to facilitate the locking pin 204 resisting the rotation about the towing yaw axis 116 and withstanding any torque that may be applied by the goose ball hitch 110 when the towing vehicle and towed vehicle are in motion without deformation or breaking, and (b) in a manner that facilitates the locking pin 204 being switched between goose ball attachment assembly 102 and the vehicle attachment assembly 106. After the locking pin 202 is installed, the goose ball attachment assembly 102 may be mounted onto the head 218 of the goose ball hitch 110 with the locking pin 204 being inserted into the slot 202. The collar 214 may be set into the latched position such that the goose ball attachment assembly 102 cannot be removed from the goose ball hitch 110.

Figure 3A:
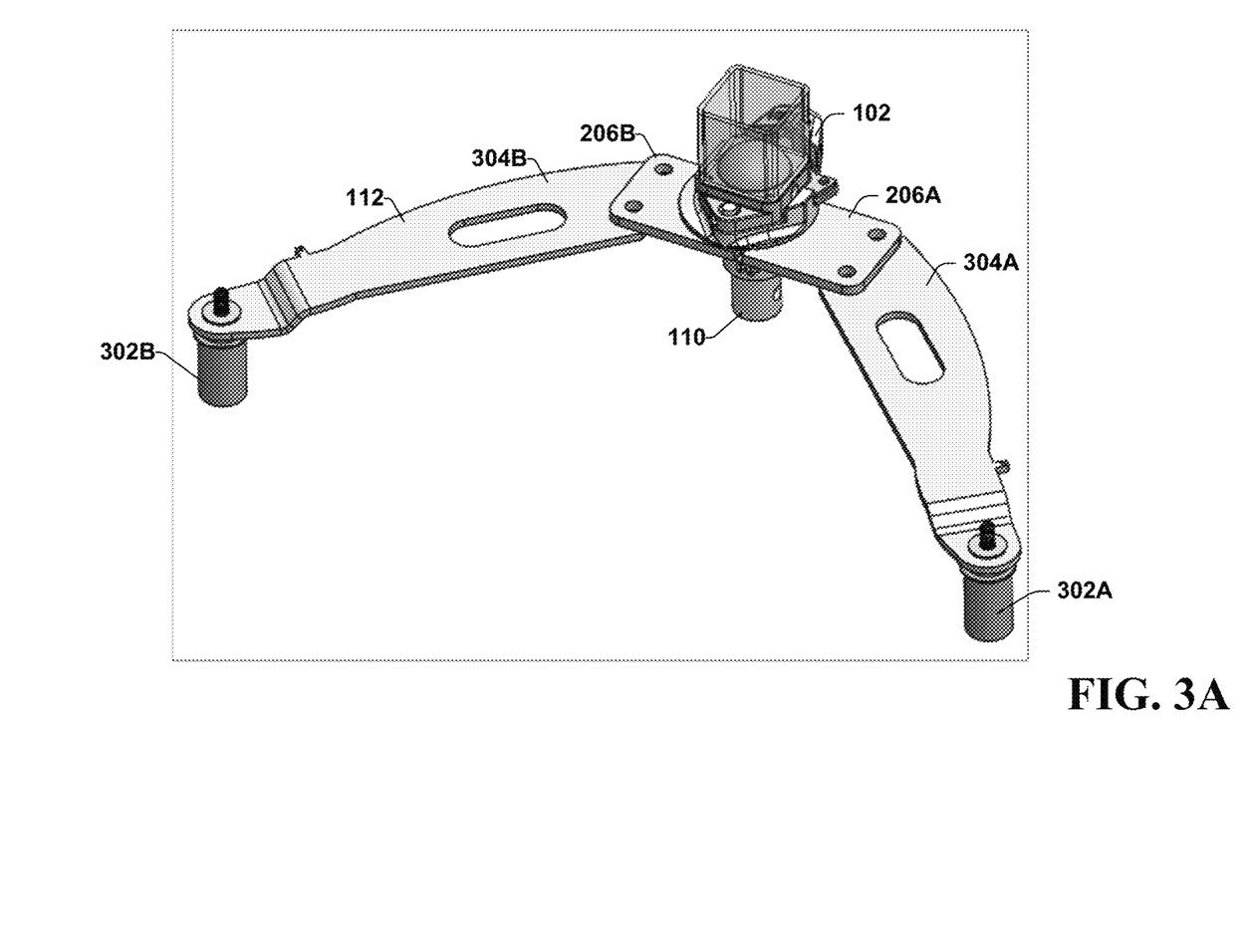
FIGS. 3A and 3B are perspective views of the goose ball mounting assembly with the goose ball attachment assembly according to the teachings of the present disclosure.
Figure 3B:
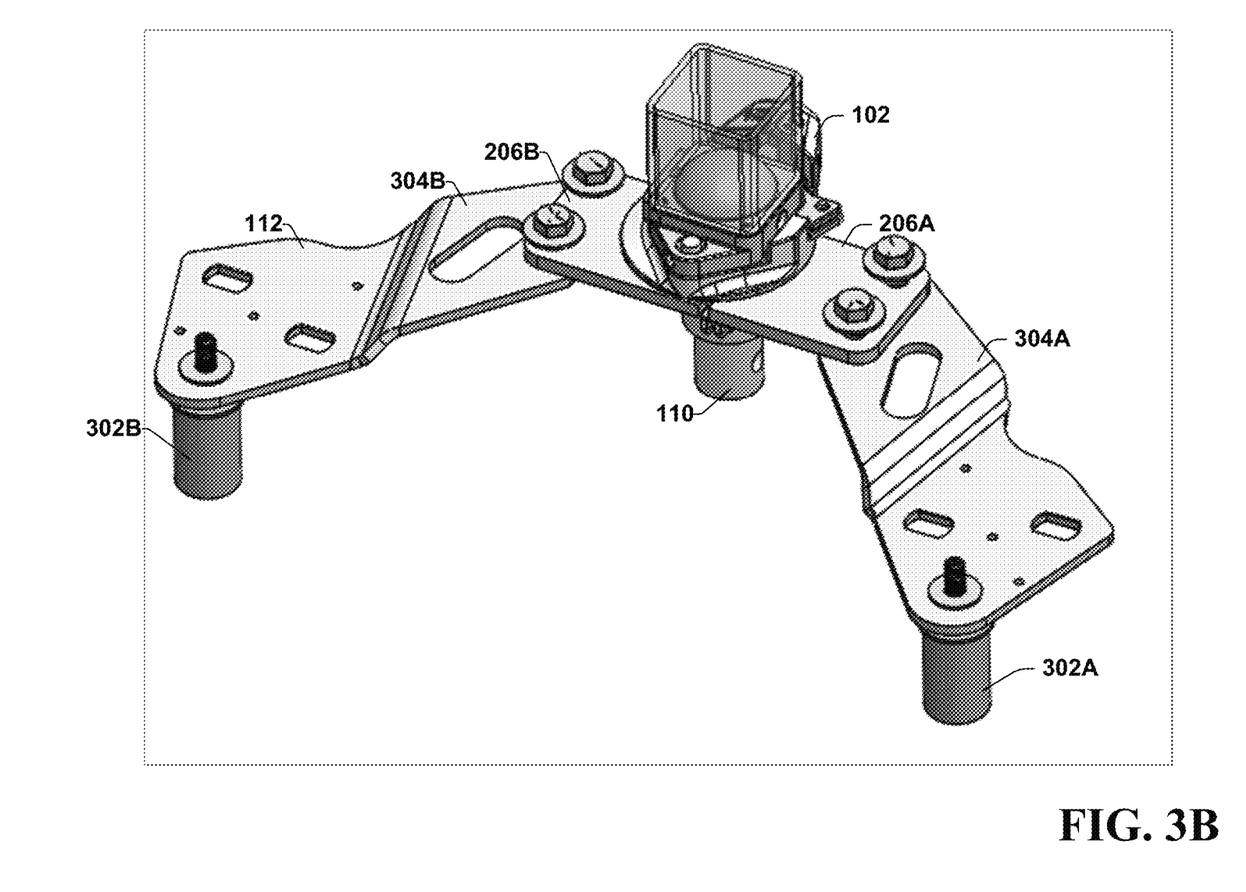

FIGS. 3A and 3B illustrate the stabilization assembly 112 that is attached to the under-vehicle mounting plate via support anchors 302A and 302B (collectively "support anchors 302"). An example of such system is disclosed in U.S. Pat. No. 9,834,050, which is incorporated herein by reference. In the illustrated example, the stabilization assembly 112 includes the stabilization plates 206, the support anchors 302, and anti-rotation arms 304A and 304B (collectively "arms 304") that rigidly couple stabilization plates 206 to the corresponding one of the support anchors 302. The stabilization plates 206 engage with the goose ball 110 to resist torsion caused by the gooseneck hitch assembly 100 when, for example, the towing vehicle turns while the locking pin 204 is installed in the goose ball attachment assembly 102. The arms 304 provide support to resist the torsion. In some examples, the arms 304 are configured to: (i) when the fastener coupling the arm 304 to the anchor support 302 is relatively tight, the position of the arm 304 is rigid, and (ii) when the fastener coupling the arm 304 to the anchor support 302 is relatively loose, a connection end of the arm 304 rotates about an axis defined by the support anchor 302 to facilitate removal of the goose ball 110 from its mounting sleeve. In the illustrated example, the arms 304 extend towards the front of the upper mounting plate 108. Alternatively, in some examples, the arms 304 may extend towards the rear of the upper mounting plate 108. In some examples, the stabilization assembly 112 may include two sets to arms 304: (i) a set of arms 304 that extend towards the front of the upper mounting plate 108 and (ii) a set of arms 304 that extend towards the rear of the upper mounting plate 108. The arms 304 may include integrated safety chain attachments. Goose ball 110 may include its own locking mechanism of any appropriate configuration. By way of a non-limiting example, the goose ball 110 may include the locking mechanism described in U.S. Pat. No. 9,802,451, which is incorporated herein by reference.

Figure 4A:
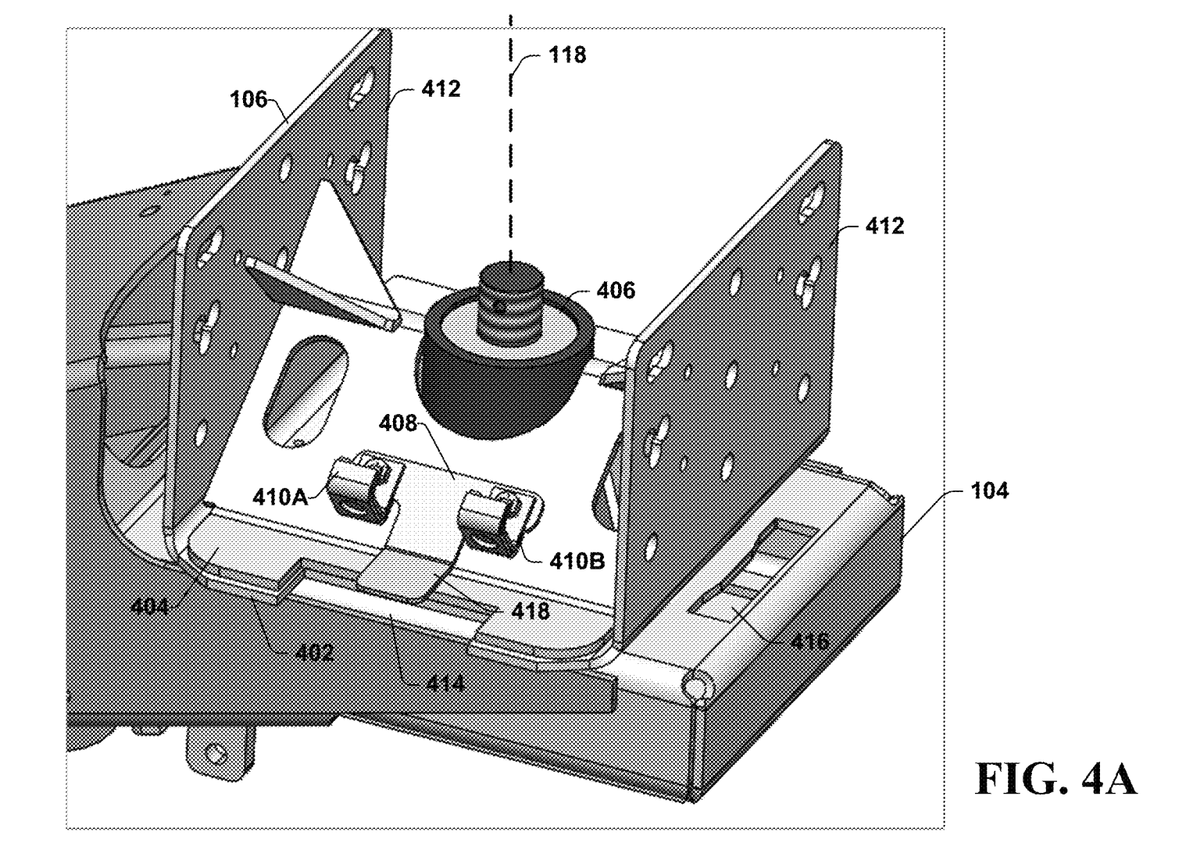
FIGS. 4A and 4B are perspective views of a vehicle attachment assembly according to the teachings of the present disclosure.
Figure 4B:
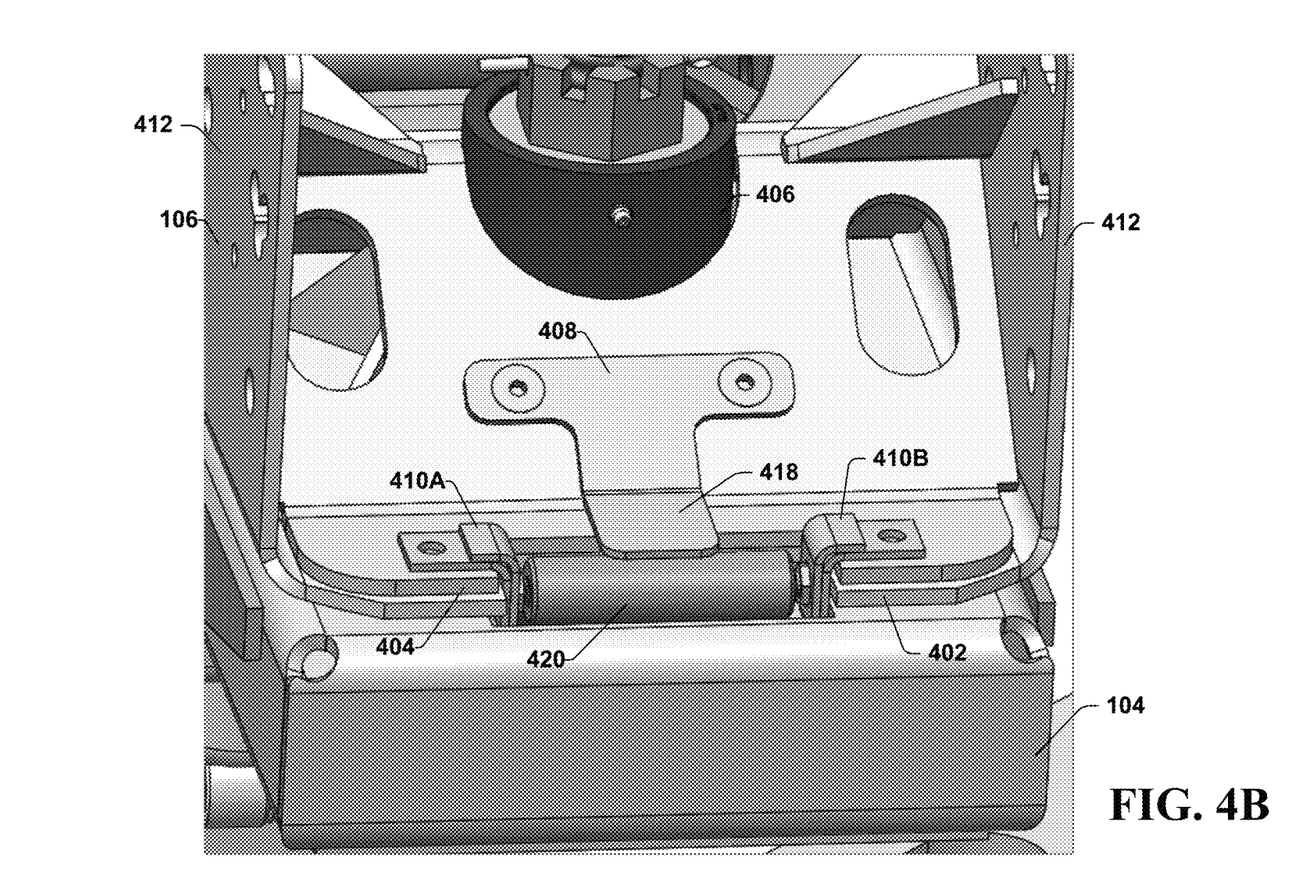

FIGS. 4A and 4B illustrate examples of the vehicle attachment assembly 106. FIG. 4A illustrates the vehicle attachment assembly 106 when the locking pin (e.g., the locking pin 204 of FIGS. 2A and 2B) is not installed in the vehicle attachment assembly 106. For exemplary purposes, in FIG. 4A, the vehicle attachment assembly 106 is rotated ninety degrees about the offset yaw axis 118 relative the body 104 of the gooseneck hitch 100. The vehicle attachment assembly 106 includes a support body 402, a support structure 404, a central rotation assembly 406, a mounting bracket 408, and mounting tabs 410A and 410B (collectively "mounting tabs 410").

The support body 402 includes sidewalls 412 where device mounting holes are configured to mount the gooseneck hitch assembly 100 to the towed vehicle 114 via fasteners (e.g., 5/8" bolts, etc.). The support structure 404 provides support to the support body 402 and the sidewalls 412. In the illustrated example, the support body 402 and the support structure 404 define a mounting slot 414. The body 104 of the gooseneck hitch assembly 100 defines a corresponding mounting cavity 416. The mounting slot 414 and mounting cavity 416 are configured to, when the mounting slot 414 and mounting cavity 416 are aligned, engage with a locking pin. In some examples, the mounting bracket 408 is attached to the support structure 404. A tab 418 of the mounting bracket 408 may extend over a portion of the mounting slot 414. In the illustrated example of FIG. 4A, with a locking pin not installed, the mounting tabs 410 are removably affixed to the mounting bracket 408.

FIG. 4B illustrates the vehicle attachment assembly 106 when a locking pin 420 is installed in the vehicle attachment assembly 106. In some embodiments, locking pin 420 may be similar to and used in a similar manner as locking pin 204 described earlier herein. In some examples, the locking pin 420 of FIG. 4B may be the same as the locking pin 204 of FIGS. 2A and 2B. In the illustrated example, the vehicle attachment assembly 106 is rotated about the offset yaw axis 118 such that the mounting slot 414 is aligned with the mounting cavity 416. The mounting slot 414 and the mounting cavity 416, when aligned with each other, may be referred to as the "aligned mounting cavity." In the illustrated example, the mounting tabs 410 have been removed from the mounting bracket 408. The locking pin 420 is coupled (e.g., via fasteners) to the mounting tabs 410. The locking pin 420 and the mounting tabs 410 are inserted into the aligned mounting cavity 416. The mounting tabs 410 may be affixed to the support structure 404 to hold the locking pin 420 in place. When the locking pin 420 is installed, the vehicle attachment assembly 106 is prevented or inhibited from rotating about the offset yaw axis 118. While the vehicle attachment assembly 106 and the stabilization assembly 112 are illustrated herein using a goose ball hitch, other hitch types may be used where a slot in the hitch may accept a coupler with a removable locking pin similar to that described above.

Figure 5A:
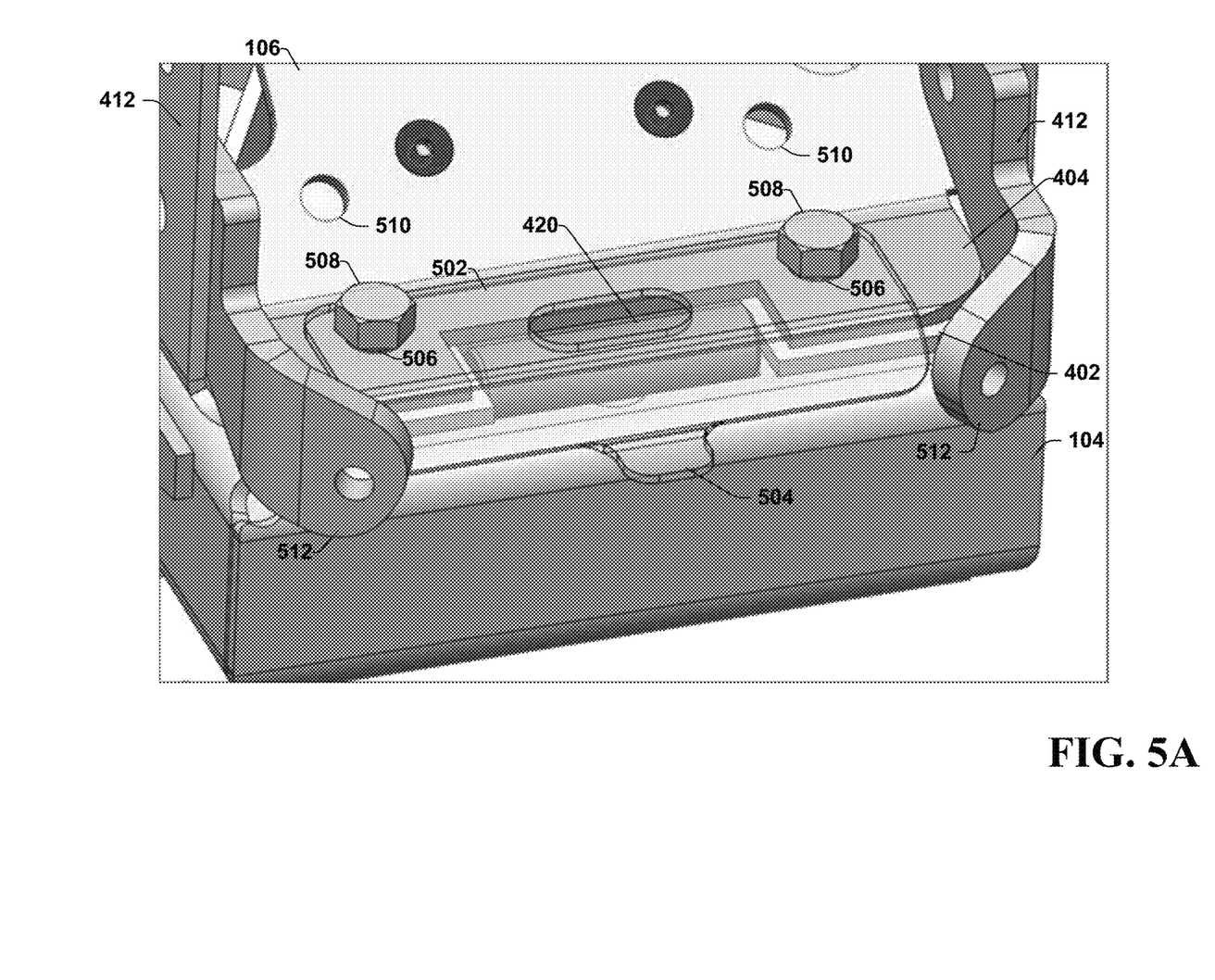
FIGS. 5A and 5B are perspective views of an example vehicle attachment assembly according to the teachings of the present disclosure.
Figure 5B:
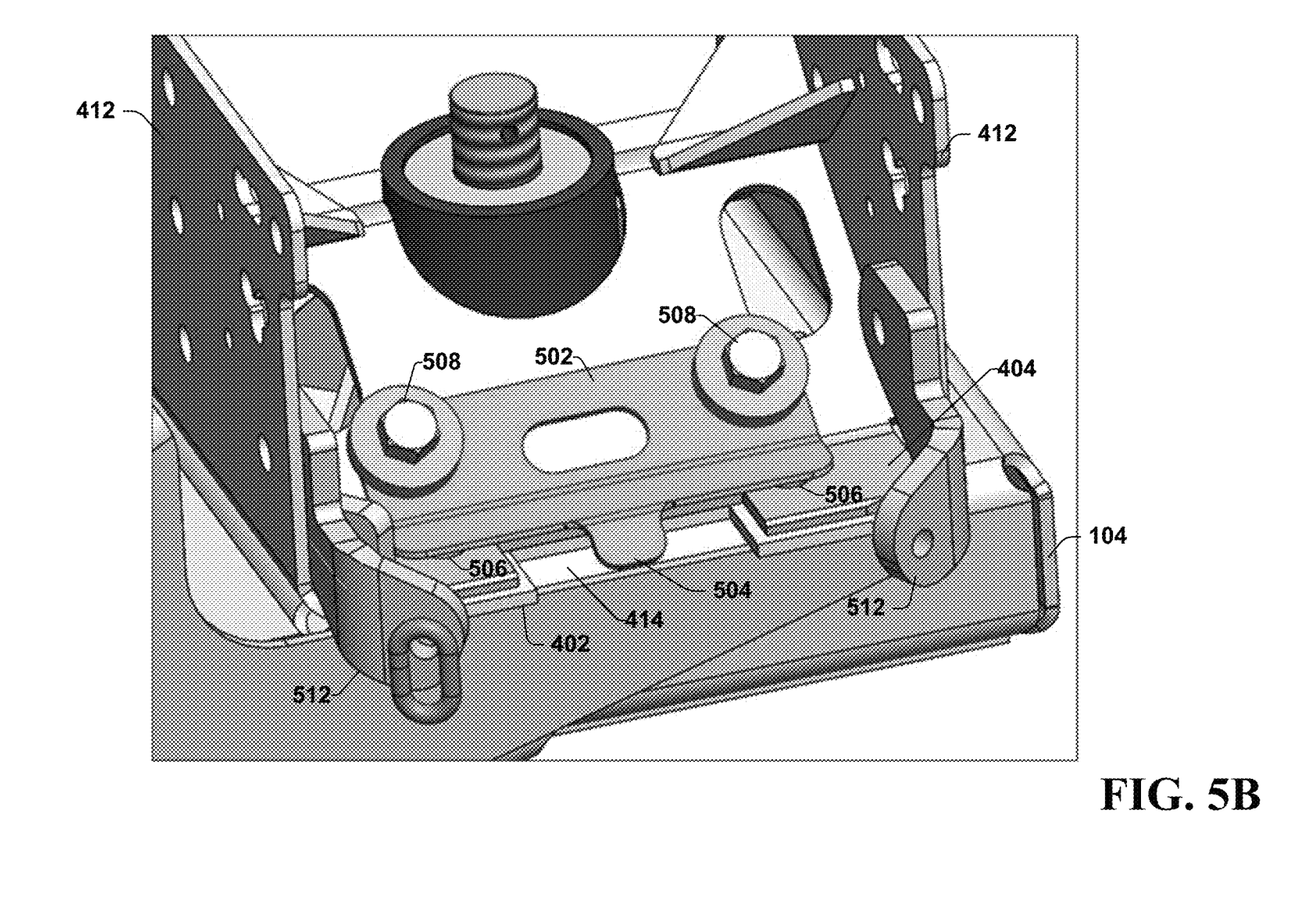

FIG. 5A illustrates another example of the vehicle attachment assembly 106 when the locking pin 420 is installed. FIG. 5B illustrates an additional example of the vehicle attachment assembly 106 when the locking pin 420 is not installed. In the illustrated example, the vehicle attachment assembly 106 includes a pin cover 502 that covers the locking pin 420 and the aligned mounting cavity when the locking pin 420 is installed. The pin cover 502 may be made of any suitable material, such as a plastic material (e.g., polypropylene, polycarbonate, etc.) or a metal material. In the illustrated example, the pin cover 502 includes a tab 504 to, for example, facilitate manipulating the pin cover 502. The pin cover 502 defines apertures 506 that correspond with apertures defined by the support body 402 and the support structure 404 to secure the pin cover 502 in the position to protect the locking pin 420 as shown in FIGS. 5A and 5B. In the illustrated example, the pin cover 502 is secured by removable fasteners 508. The support structure 404 defines apertures 510 to secure the pin cover 502 to the support structure 404 (e.g., by the fasteners 508) when, for example, the locking pin 420 is not installed in the aligned mounting cavity as illustrated in FIG. 5B. In the illustrated example, the support structure 404 includes wing structures 512 to protect the locking pin assembly (e.g., the locking pin 420, aligned mounting cavity, the pin cover 502, and the fasteners 508, etc.).

An example gooseneck mount for a towed vehicle includes an attachment assembly and a turret. When the gooseneck mount is installed to couple the towed vehicle to a towing vehicle, the attachment assembly mounts the gooseneck mount to a goose ball hitch of a towing vehicle. The attachment assembly is configured to receive a locking pin. When the gooseneck mount is installed on the towed vehicle, the turret mounts the gooseneck mount to the towed vehicle. The turret is configured to receive the same locking pin as the attachment assemble. When the locking pin is installed in the attachment assembly, the locking pin inhibits rotation of the attachment assembly about a first yaw axis defined by the goose ball hitch. When the locking pin is installed in the turret, the locking pin inhibits rotation of the turret about a second yaw axis defined by the gooseneck mount relative the towed vehicle.

An example trailer mounting system includes a stabilization assembly, a locking pin, a body, an attachment assembly and a vehicle attachment assembly. The stabilization assembly attaches to a bed of a truck or other towing vehicle. The stabilization assembly including a goose ball hitch that includes a mounting slot in its ball portion (sometimes referred to as the "head" of the goose ball hitch). The locking pin fits within the mounting slot of the goose ball hitch. The attachment assembly is attached to a first, lower end of the body. The attachment assembly includes a coupler that mounts onto the goose ball hitch. When the locking pin is attached to the coupler, the locking pin inhibits rotation of the attachment assembly about a first towing yaw axis. The vehicle attachment assembly is rotatably attached to a second, upper end of the body such that the vehicle attachment assembly and the body define a second towing yaw axis that is different from and distant from the first towing yaw axis. The vehicle attachment assembly includes a support body that defines a second mounting slot that corresponds to a mounting cavity defined in the second end of the body. When aligned with each other, the second mounting slot and the mounting cavity can receive the locking pin. When the locking pin is installed in the aligned second mounting slot and mounting cavity, the locking pin inhibits the rotation of the vehicle attachment assembly about the second towing yaw axis.

The stabilization assembly may include a pair of stabilization plates that fit around a base of the goose ball hitch to inhibit rotation of the goose ball hitch about the first towing yaw axis. The stabilization assembly may also include at least two arms. Each arm has a first end attached one of the stabilization plates and a second end configured to attach to the bed of the truck.

The attachment assembly further may include a mounting bracket to facilitate attaching the locking pin to the coupler. The coupler may define a pin slot that transverses an internal cavity also defined by the coupler. The attachment assembly may include up to three fasteners. The first fastener is located at a first end of the pin slot to affix a first end of the locking pin to the coupler. The second fastener is located at a second end of the pin slot to affix a second end of the locking pin to the mounting bracket. The third fastener is located at a second end of the pin slot to affix the mounting bracket to the coupler.

The vehicle attachment assembly may include a mounting bracket, and a pair of mounting tabs. The mounting bracket may include a tab portion that extends over the second mounting slot. In such an example, when the locking pin is installed in the vehicle attachment assembly, the tab portion mounting bracket and the pair of mounting tabs hold the locking pin into the second mounting slot and the mounting cavity.

An example gooseneck mount for a towed vehicle includes a single locking pin, an attachment assembly, and a vehicle attachment assembly. The locking pin is configured to fit within a slot defined in a head of a goose ball hitch. The attachment assembly attached to a first end of a body of the gooseneck mount. The attachment assembly mounts onto the head of the goose ball hitch. The attachment assembly includes a coupler configured to (i) mount onto the head of the goose ball hitch and (ii) accept the locking pin. When the locking pin is attached to the coupler, the locking pin inhibits rotation of the attachment assembly about a first towing yaw axis defined by the goose ball hitch. The vehicle attachment assembly attached to a second end of the body of the gooseneck mount and is configured to rotate about a second towing yaw axis relative the body of the gooseneck mount. The vehicle attachment assembly includes a support body that defines a second mounting slot that corresponds to and aligns with a mounting cavity defined in the second end of the body of the gooseneck mount. The second mounting slot and the mounting cavity are configured to receive the locking pin when aligned. When the locking pin is fit within the second mounting slot and the mounting cavity, the locking pin inhibits the rotation of the vehicle attachment assembly about the second towing yaw axis.

Although the embodiments of the present invention have been illustrated in the accompanying drawings and described in the foregoing detailed description, it is to be understood that the present disclosure is not to be limited to just the embodiments disclosed, but that the disclosure described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A trailer mounting system comprising:
    a stabilization assembly configured to be attached to a bed of a truck, the stabilization assembly comprising a goose ball hitch defining a first mounting slot in a ball portion of the goose ball hitch;
    a locking pin configured to fit within the first mounting slot in the ball portion;
    a body;
    an attachment assembly attached to a first end of the body, the attachment assembly comprising a coupler configured to mount onto the ball portion of the goose ball hitch, wherein when the locking pin is attached to the coupler, the locking pin inhibits rotation of the attachment assembly about a first towing yaw axis; and
    a vehicle attachment assembly rotatably attached to a second end of the body about a second towing yaw axis, the vehicle attachment assembly comprising a support body that defines a second mounting slot that corresponds to a mounting cavity defined in the second end of the body, the second mounting slot and the mounting cavity configured to receive the locking pin when aligned, wherein when the locking pin is fit within the second mounting slot and the mounting cavity, the locking pin inhibits the rotation of the vehicle attachment assembly about the second towing yaw axis.

2. The trailer mounting system of claim 1, wherein the stabilization assembly further comprises a pair of stabilization plates that fit around a base of the goose ball hitch to inhibit rotation of the goose ball hitch about the first towing yaw axis.

3. The trailer mounting system of claim 2, wherein the stabilization assembly further comprises at least two arms, each arm having a first end attached one of the stabilization plates and a second end configured to attach to the bed of the truck.

4. The trailer mounting system of claim 1, wherein the attachment assembly further comprises a mounting bracket to facilitate attaching the locking pin to the coupler.

5. The trailer mounting system of claim 4, wherein the coupler defines a pin slot that transverses a cavity defined by the coupler, wherein to attach the first locking pin, the attachment assembly includes:
    a first fastener at a first end of the pin slot to affix a first end of the locking pin to the coupler;
    a second fastener at a second end of the pin slot to affix a second end of the locking pin to the mounting bracket; and
    a third fastener at a second end of the pin slot to affix the mounting bracket to the coupler.

6. The trailer mounting system of claim 1, wherein the vehicle attachment assembly further comprises a mounting bracket, and a pair of mounting tabs.

7. The trailer mounting system of claim 6, wherein the mounting bracket includes a tab portion that extends over the second mounting slot.

8. The trailer mounting system of claim 7, wherein when the locking pin is installed in the vehicle attachment assembly, the tab portion mounting bracket and the pair of mounting tabs hold the locking pin into the second mounting slot and the mounting cavity.

9. A gooseneck mount for a towed vehicle, the gooseneck mount comprising:
    a single locking pin configured to fit within a slot defined in a head of a goose ball hitch;
    an attachment assembly attached to a first end of a body of the gooseneck mount and configured to mount onto head of the goose ball hitch, the attachment assembly comprising a coupler configured to accept the locking pin, wherein when the locking pin is attached to the coupler, the locking pin inhibits rotation of the attachment assembly about a first towing yaw axis defined by the goose ball hitch; and
    a vehicle attachment assembly attached to a second end of the body of the gooseneck mount and configured to rotate about a second towing yaw axis relative the body of the gooseneck mount, the vehicle attachment assembly comprising a support body that defines a second mounting slot that corresponds to a mounting cavity defined in the second end of the body of the gooseneck mount, the second mounting slot and the mounting cavity configured to receive the locking pin when aligned, wherein when the locking pin is fit within the second mounting slot and the mounting cavity, the locking pin inhibits the rotation of the vehicle attachment assembly about the second towing yaw axis.

10. The gooseneck mount of claim 9, wherein the attachment assembly further comprises a mounting bracket to facilitate attaching the locking pin to the coupler.

11. The gooseneck mount of claim 10, wherein the coupler defines a pin slot that transverses a cavity defined by the coupler, wherein to attach the first locking pin, the attachment assembly includes:

a first fastener at a first end of the pin slot to affix a first end of the locking pin to the coupler;

a second fastener at a second end of the pin slot to affix a second end of the locking pin to the mounting bracket; and a third fastener at a second end of the pin slot to affix the mounting bracket to the coupler.

12. The gooseneck mount of claim 9, wherein the vehicle attachment assembly further comprises a mounting bracket, and a pair of mounting tabs.

13. The trailer mounting system of claim 12, wherein the mounting bracket includes a tab portion that extends over the second mounting slot.

14. The gooseneck mount of claim 13, wherein when the locking pin is installed in the vehicle attachment assembly, the tab portion mounting bracket and the pair of mounting tabs hold the locking pin into the second mounting slot and the mounting cavity.

15. A gooseneck mount for a towed vehicle, the gooseneck mount comprising:

an attachment assembly to mount the gooseneck mount to a goose ball hitch of a towing vehicle, the attachment assembly configured to receive a locking pin; and a turret to mount the gooseneck mount to the towed vehicle, the turret configured to receive the same locking pin as the attachment assembly;

wherein, when the locking pin is installed in the attachment assembly, the locking pin inhibits rotation of the attachment assembly about a first yaw axis defined by the goose ball hitch; and wherein, when the locking pin is installed in the turret, the locking pin inhibits rotation of the turret about a second yaw axis defined by the gooseneck mount relative the towed vehicle.

* * * * *